United States Patent Office 3,272,858
Patented Sept. 13, 1966

3,272,858
METHOD OF PRODUCING ARYLAMINO ACID COLOR COUPLERS
Gerald Noel White, Carahaltan, Surrey, England, assignor to The Pavelle Corporation, New York, N.Y., a corporation of New York
No Drawing. Filed Mar. 23, 1962, Ser. No. 182,082
8 Claims. (Cl. 260—518)

The present invention relates to new aryl amino acids, useful as color couplers in the manufacture of color film and paper, and to a process for preparing them.

I have found that new aryl amino acids, useful as color couplers, can be prepared by condensing a malonic dialkyl ester with an aryl amino ester and subjecting the condensation product to hydrolysis. While I do not wish to be limited by theoretical explanations, I believe that, in the condensation stage, the malonic acid ester reacts with the aryl amino acid with the elimination of one molecule of alcohol to form an N-substituted mono malonic acid amide. The latter product on hydrolysis forms first the free acid, two molecules of which interact with loss of carbon dioxide, and a molecule of malonic acid. Having regard to the high reactivity of the mono malonic acid ester it is probable that further reactions with the amino acid formed on the first condensation take place yielding a higher molecular weight amino acid. Thus the new compounds prepared according to the invention are believed to have the formula

$NH_2.R.CO.CH_2.CO.NH.R.CO.CH_2.CO.NH.R.COOH$ where R is the residue of an aryl amino acid (in which both the amino group and the carboxyl group are attached to the aryl ring).

The new compounds prepared by the process according to the invention are useful as yellow color couplers and give rise to color images of improved fastness to light. It is a particular advantage of the new compounds prepared according to the invention that they can be simply prepared in two stages in contradistinction to known color couplers the preparation of which in general involves several stages. As a result, the new color couplers according to this invention can be prepared in a particularly simple and economic manner.

According to the present invention I provide a process for the preparation of new compounds useful as color couplers which comprises condensing an aryl aminoester with a malonic acid dialkylester and subjecting the resultant condensation product to hydrolysis.

The malonic acid dialkyl ester is preferably one in which the alkyl groups have from 1 to 5 carbon atoms, dimethyl malonate and diethyl malonate being preferred.

The aryl amine ester is preferably of the formula $NH_2R\ COOR^1$ in which R is a benzene residue which may be substituted by one or more carboxy groups, alkoxy groups or alkyl groups and $R^1$ is an alkyl group having 1–5 carbon atoms. Examples of such esters are p-aminobenzoic ethyl or methyl ester, m-aminobenzoic ethyl or methyl ester, 5-amino isophthalic methyl ester, and 2-methoxy-4-aminobenzoic ethyl ester.

The condensation is preferably carried out in the presence of a condensation catalyst at a temperature between 165° C. and 180° C. Suitable condensing catalysts include tertiary bases, for example, triethanolamine, pyridine, dimethylaniline and collidine.

If desired, the condensation may be carried out in the presence of a solvent but where a tertiary amine is used as condensation catalyst this may also serve as a solvent.

The relative proportions of the aryl amino ester and the malonic acid diester are not critical in the condensation stage. In general, I prefer to use equimolecular proportions, but an excess of the diester is sometimes desirable.

The condensation product may be then hydrolyzed under alkaline conditions, preferably with an aqueous or alcoholic solution of an alkali metal hydroxide. Aqueous caustic soda or aqueous caustic potash is particularly satisfactory. Hydrolysis is preferably carried out at a temperature of 60° C. to 80° C.

The aryl amino acids of the present invention may be used as color couplers, as such, or in the presence of an adsorption agent to prevent diffusion such as a long chain fatty acid e.g., lauric or stearic acid. Preferably, however, the compounds are acylated with a fatty acid halide such as lauric or stearic acid halide, to decrease diffusion. The acylation is conveniently effected in a conventional manner using a chloride of the selected acid.

Certain of the products prepared according to the invention may be used as the free base as azo couplers with the products of oxidation of a developer instead of the azo methine couplers normally used for color images.

The process of the present invention is illustrated in the following examples.

Example 1

264 grams of p-amino benzoic ethyl ester and 264 ml. of diethylmalonate with the addition of 20 ml. of pyridine were heated rapidly to 165° C. The evolution of ethanol set in vigorously and the temperature maintained itself without heating. After allowing the reaction to moderate, the mixture was kept at 165° C. until the loss of ethanol became sluggish. The temperature was then raised to 175° C.–180° C. for ½ hour. Alternatively the temperature may be raised until the loss in weight corresponds to approximately one molecular equivalent (based on condensation product) of ethanol plus the pyridine originally added provided a temperature of 180° C. is not exceeded.

The product from the above operation was poured while still hot into 1 liter of methanol with vigorous stirring. The quicker this is done the better, as a dense crystalline mass is formed and any of the product added after this has become semi-solid and has a tendency to set into lumps. The mixture containing the thick crystalline mass was dispersed into a smooth slurry with 1 liter of water at 70° C. and then well stirred while 200 ml. of 50% aqueous caustic potash were added in small quantities allowing the pH to fall from 12 to about 10 before the next addition, the temperature being kept during the process at 70° C. After all the alkali had been added the solution was kept at 70° C. no longer than was necessary for the solid to dissolve and a small sample no longer to throw a precipitate on dilution with water. The solution was then acidified to Congo red by the addition of 20% hydrochloric acid and filtered without cooling through cloth. The cake was dispersed in about 1 liter of acetone and after standing for at least 1 hour was filtered and washed with acetone. The yield was 180 grams of pure white powder, melting point 262° C.

Example 2

150 grams of the above product finely ground were dispersed in 300 ml. of pyridine. With agitation, 120 ml. of lauroyl chloride were added over 20 minutes, the temperature being allowed to rise to 90° C. The mixture was stirred at this temperature for 2 hours, during which some separation may occur. The product was then poured out into 1500 ml. of water containing 300 ml. of hydrochloric acid (specific gravity 1.2) with good agitation. The precipitate formed was filtered, washed with water and pressed hard to form a cake which was dried at 50° C. to 60° C. and then extracted with 1 liter of ethanol at 60° C. and after filtering washed with ethanol and dried. The yield was 190–200 grams.

I claim:
1. A method of producing aryl amino acid color couplers consisting essentially of condensing malonic dialkyl esters selected from the group consisting of malonic dialkyl esters having alkyl groups containing from 1 to 5 carbon atoms with an aryl amino ester chosen from the group consisting of p-aminobenzoic methyl and ethyl esters, 5-amino isophthalic methylester, and 2-methoxy-4-amino benzoic ethyl ester and subjecting the condensation product to hydrolysis at a temperature of between 60° C. and 80° C.

2. A method according to claim 1 wherein said dialkyl-malonic acid ester is dimethyl malonate.

3. A method according to claim 1 wherein said dialkyl-malonic acid ester is diethyl malonate.

4. A method of producing aryl amino acid color couplers consisting essentially of condensing malonic dialkyl esters selected from the group consisting of malonic dialkyl esters having alkyl groups containing from 1 to 5 carbon atoms with an aryl amino ester chosen from the group consisting of p-aminobenzoic methyl and ethyl esters, 5-amino isophthalic methylester, and 2-methoxy-4-amino benzoic ethyl ester in the presence of a condensation catalyst chosen from the group consisting of triethanolamine, pyridine, dimethylaniline and collidine at a temperature between 165° C. and 180° C.

5. A method according to claim 4 wherein said condensation is carried out in the presence of a tertiary amine solvent.

6. A method of producing aryl amino acid color couplers consisting essentially of condensing malonic dialkyl esters selected from the group consisting of malonic dialkyl esters having alkyl groups containing from 1 to 5 carbon atoms with an aryl amino ester chosen from the group consisting of p-aminobenzoic methyl and ethyl esters, 5-amino isophthalic methylester, and 2-methoxy-4-amino benzoic ethyl ester and subjecting the condensation product to hydrolysis at a temperature of between 60° C. and 80° C. under alkaline conditions.

7. A method according to claim 6 wherein said condensation product is hydrolyzed with a solution of an alkali metal hydroxide.

8. A method according to claim 7 wherein said condensation product is hydrolyzed at a temperature of 60° C. to 80° C.

References Cited by the Examiner

Brown et al.: "Australian Journal of Chemistry," vol. 7, pp. 362–4 (1954).

Hickinbottom: Reactions of Organic Compounds, 2nd ed., pp. 227, 264, and 294 (1948).

Koller: "Berichte," vol. 49, pp. 1108–11 (1927).

Pietrzok et al.: "Chemical Abstracts," vol. 56, p. 567 (1962).

CHARLES B. PARKER, *Primary Examiner.*

G. P. D'ANGELO, ROBERT V. HINES,
*Assistant Examiners.*